United States Patent [19]

Engelmann et al.

[11] Patent Number: 4,546,135

[45] Date of Patent: Oct. 8, 1985

[54] SINTERABLE, FINELY DIVIDED MOLDED MATERIAL BASED ON POLYVINYL CHLORIDE

[75] Inventors: Manfred Engelmann, Burghausen; Otto Plewan, Neuötting; Helmut Kraus, Töging; Heinz Klippert, Burgkirchen, all of Fed. Rep. of Germany

[73] Assignee: Hoechst Aktiengesellschaft, Fed. Rep. of Germany

[21] Appl. No.: 714,347

[22] Filed: Mar. 21, 1985

Related U.S. Application Data

[63] Continuation of Ser. No. 563,669, Dec. 20, 1983, abandoned.

[30] Foreign Application Priority Data

Dec. 22, 1982 [DE] Fed. Rep. of Germany ....... 3247472

[51] Int. Cl.$^4$ ................................................ C08K 5/42
[52] U.S. Cl. .................................... 524/158; 524/157; 525/309; 526/329.4
[58] Field of Search ............... 524/157, 158; 525/309; 526/329.4

[56] References Cited

U.S. PATENT DOCUMENTS

| | | | |
|---|---|---|---|
| 3,334,156 | 8/1967 | Calentine | 525/308 |
| 3,663,657 | 5/1972 | Sturt | 525/317 |
| 3,736,282 | 5/1973 | Fetter | 526/329.4 |
| 3,766,106 | 10/1973 | Yurimoto | 524/308 |
| 3,951,883 | 4/1976 | Ruchlak | 526/225 |
| 3,966,696 | 6/1976 | Kidoh | 526/329.4 |
| 3,969,431 | 7/1976 | Gallagher | 525/308 |
| 4,012,460 | 3/1977 | Takahashi | 525/308 |
| 4,013,608 | 3/1977 | Nagoshi | 526/329.4 |
| 4,137,381 | 1/1979 | Kraus | 524/244 |
| 4,155,954 | 5/1979 | Buning | 525/308 |
| 4,206,298 | 6/1980 | Reichert | 526/210 |
| 4,371,677 | 2/1983 | Morningstar | 526/329.4 |

*Primary Examiner*—Paul R. Michl
*Attorney, Agent, or Firm*—Connolly and Hutz

[57] ABSTRACT

A sinterable, finely divided molding material and the preparation thereof are described. The molding material is composed of a vinyl chloride (graft) copolymer, at least one anionic and/or nonionic emulsifier and, if appropriate, small quantities of additives.

The vinyl chloride (graft) copolymer contains 95 to 70% by weight of polymerized units of vinyl chloride, 5 to 30% by weight of polymerized units of an alkyl acrylate having 3 to 10 carbon atoms, 0 to 7% by weight of polymerized units of ethylene and 0 to 15% by weight of polymerized units of vinyl acetate.

The molding material is suitable for the production of flexible, sintered moldings, in particular separator plates, for electric cells.

10 Claims, No Drawings

SINTERABLE, FINELY DIVIDED MOLDED MATERIAL BASED ON POLYVINYL CHLORIDE

This application is a continuation of Ser. No. 563,669 filed Dec. 20, 1983, now abandoned.

The invention relates to a molding material composed of a sinterable polymer prepared by copolymerization or graft copolymerization in aqueous suspension and containing principally polymerized vinyl chloride units, a process for its preparation and a process for the production from the molding material of separator plates for electric cells.

It is known to employ polyvinyl chloride for the production of sintered moldings, for example separator plates for electric cells.

Appropriate molding materials have been described in German Offenlegungsschriften No. 2,127,654, 2,310,431, 2,646,595 and 3,018,922.

All these molding materials produce sintered moldings, for example separator plates which are comparatively rigid and stiff, so that they break, completely or partially, even at bending angles less than 180° when bent round a firm edge. Such materials are unsuitable for the production of so-called separator compartments, since flexible plates which display no cracks even when bent through 180° are required for this purpose.

A molding material has now been found which can be sintered to give readily flexible moldings and which does not have the disadvantages described.

This sinterable, finely divided molding material based on polyvinyl chloride having a K-value of 55 to 90, a bulk density of 400 to 700 g/liter, an average particle size of 10 to 50 μm and a particle size distribution of:

| 99 to 30% by weight | <33 μm |
| 1 to 60% by weight | from 33 to 63 μm |
| 0 to 9% by weight | from 63 to 125 μm and |
| 0 to 1% by weight | >125 μm | is composed of:

(I) 99.8 to 97% by weight, relative to the molding material, of a (graft) copolymer which has been prepared by suspension polymerization in an aqueous phase and which, in turn, has the following composition, in each case relative to the (graft) copolymer:

(a) 95 to 70% by weight of polymerized units of vinyl chloride, (b) 5 to 30% by weight of polymerized units of at least one alkyl acrylate having 3 to 10 carbon atoms in the alkyl group, (c) 0 to 7% by weight of polymerized units of ethylene and (d) 0 to 15% by weight of polymerized units of vinyl acetate, subject to the proviso that the amount of (d) is at least 3/7 of the amount of (c) and the total of the amounts of (b) plus (c) plus (d) is 5 to 30% by weight; and also:

(II) 0.05 to 0.5% by weight of at least one anionic and/or at least one nonionic emulsifier having an HLB value of 10 to 40, (III) a residue which is composed of suspending agent(s), residues of activators and other polymerization auxiliaries, it being possible for the residue also to contain a small amount of at least one further additive, subject to the proviso that the total of the amounts of I plus II plus III is 100% by weight.

If the polymer fraction in the molding material contains less than 5% by weight of polymerized units of the alkyl acrylate, the separator plates produced therefrom do not exhibit adequate flexibility. If the content is more than 30% by weight of polymerized units of the alkyl acrylate, the molding material is no longer readily sinterable to form porous moldings, since the individual polymer grains fuse together too greatly. In addition, the use of greater amounts of alkyl acrylate would make the product unnecessarily expensive. The polymer fraction in the molding material preferably contains 10 to 20% by weight of alkyl acrylate.

The alkyl group of the alkyl acrylate should have 3 to 10 carbon atoms. Esters having alkyl groups with less than 3 and more than 10 carbon atoms do not impart adequate flexibility to the sintered moldings. Suitable alkyl acrylates are those which, as homopolymers, have glass transition temperatures (Tg) of 203 to 248 K, for example n-propyl acrylate, n-hexyl acrylate, cyclohexyl acrylate, n-octyl acrylate, n-decyl acrylate, ethylhexyl acrylate, iso-butyl acrylate and n-butyl acrylate. It is preferable to use alkyl acrylates in which the alkyl group contains 4 to 8 carbon atoms. Even molding materials which contain only polymerized units of vinyl chloride and an alkyl acrylate in the polymer fraction produce flexible, sintered moldings, for example separator plates for electric cells, having good properties. These can be improved further if the polymer fraction in the molding material additionally contains polymerized units of vinyl acetate.

A further improvement can be observed if the polymer fraction of the molding material contains polymerized units of vinyl acetate and ethylene, subject to the proviso that the amount of polymerized vinyl acetate units is at least 3/7 of the amount of polymerized ethylene units. If the content of polymerized units of vinyl acetate is less than 3/7 of the amount of polymerized units of ethylene, the preparation of the molding materials causes difficulties, lumps are formed in the polymerization and the desired uniformity of the polymer grains produced, which, in turn, results in uniform pore size distribution in the sintered molding, is no longer achieved.

Proportions of polymerized vinyl acetate units in the polymer fraction of the molding material higher than 15% by weight have an adverse effect on the flexibility of the sintered moldings. Good results are obtained if the polymer fraction of the molding material contains 0.3 to 11% by weight of polymerized units of vinyl acetate. For the polymerization of vinyl chloride in order to prepare the molding material, the vinyl acetate is, on the one hand, employed as such and, on the other hand, is also employed in the form of a copolymer with ethylene in a weight ratio of 70/30 to 30/70.

If the polymer fraction of the molding material contains more than 7% by weight of polymerized units of ethylene, the particle size of the molding material becomes non-uniform. It is no longer possible to maintain the particle size distribution required for the production of sintered separator plates. Also, the process is rendered unnecessarily expensive, since larger amounts of suspending agent are required for the preparation of molding materials having higher ethylene contents. The polymer fraction of the molding material preferably contains 0.3 to 2.5% by weight of polymerized units of ethylene.

If, in addition to alkyl acrylates, vinyl acetate monomer and/or an ethylene/vinyl acetate copolymer are also employed in order to improve the properties of the polymer fraction of the molding material further, account must be taken of the appropriate proportion of copolymerized units of ethylene and vinyl acetate in regard to the amount of copolymerized units of the alkyl acrylate, so that in every case the molding material contains 95 to 70% by weight of polymerized units of vinyl chloride. At over 95% by weight of polymerized units of vinyl chloride in the polymer fraction of the molding material, the sintered articles, for example separator plates, produced from the molding material are not adequately flexible. Below 70% by weight of polymerized units of vinyl chloride, the production costs of the molding material become unnecessarily expensive, and no additional advantages are observed, in fact disadvantages are often observed.

In addition to a polymer fraction of 99.8 to 97% by weight, the molding material also contains 0.05 to 0.5% by weight of at least one anionic emulsifier or at least one nonionic emulsifier, having an HLB value of 10 to 40. It is also possible to employ mixtures of several such emulsifiers, in which case the mixture should have an HLB value of 10 to 20. The HLB value can be determined by various methods, see Römpp's Chemie Lexikon ("Lexicon of Chemistry"), 7th Edition, Stuttgart, 1973, Volume 3 H-L, page 1478, right-hand column. Examples of suitable emulsifiers are the alkali metal, alkaline earth metal or ammonium salts of fatty acids, such as lauric, palmitic or stearic acid; of acid sulfuric acid esters of fatty alcohols and of dialkyl sulfosuccinates, and also the alkali metal and ammonium salts of fatty acids containing epoxy groups, such as epoxystearic acid, of reaction products of per-acids, for example peracetic acid, with unsaturated fatty acids, such as oleic or linoleic acid, or unsaturated hydroxy-fatty acids, such as ricinoleic acid, and also alkylsulfonic acids having at least 8 carbon atoms as well as alkylarylsulfonic acids having at least 3 carbon atoms in the carbon chain, such as dodecylbenzenesulfonic or dibutylnaphthalenesulfonic acid and the alkali metal, alkaline earth metal or ammonium salts thereof.

Additionally, fatty acid partial esters, containing oxyethylene groups, of polyhydric alcohols, such as polyoxyethyleneglycerol monostearate; polyoxyethylenesorbitan monolaurate, monooleate, monopalmitate or monostearate; polyoxyethylene esters of fatty alcohols or aromatic hydroxy compounds; polyoxyalkylene esters of fatty acids and polypropylene-/polyethylene oxide condensation products.

Although cationic emulsifiers also produce sinterable molding materials, they can be used less advantageously in the polymerization, since they produce long polymerization times, so that they require an excessively high amount of initiator in order to enable the process to be carried out reasonably economically. If the HLB value of the emulsifier or emulsifier mixture present in the molding material is less than 10, sintered moldings, for example separator plates for electric cells, are obtained which are not sufficiently wettable and do not exhibit an adequate capillary rise (for the method of determination see later in the text). The same applies to an emulsifier content in the molding material of less than 0.05% by weight (relative to the molding material). If the emulsifier content is greater than 0.5% by weight (relative to the molding material), difficulties can occur in the preparation of the polymer. In some cases an impairment in the stability to heat or the pourability is observed, as well as a tendency to adhere to pieces of equipment. In general, emulsifiers or emulsifier mixtures having an HLB value of 10 to 20 are suitable; in exceptional cases the HLB value of the emulsifier used can be up to 40. In addition to the polymer and emulsifier(s), the molding material also contains a remainder which is composed of suspending agent(s) and residues of activators and other polymerization auxiliaries, and which can contain a small amount of at least one further additive. Such additives can be, for example: antioxidants, heat stabilizers, pigments, wetting agents and agents for improving the antistatic properties.

Sintered, flexible moldings, in particular separator plates for electric cells, having particularly good properties are obtained from molding materials containing, as the emulsifier, at least one of the following free sulfonic acids: alkylsulfonic acids having 8 to 16 carbon atoms in the alkyl group and alkylarylsulfonic acids having 3 to 16 carbon atoms in the alkyl chain, and, as a further additive, 0.005 to 0.5% by weight, relative to the molding material, of at least one water-soluble wetting agent containing 12 to about 50 carbon atoms and a quaternary nitrogen atom which forms a salt with a carboxylic or sulfonic acid group. Molding materials of this type produce separator plates for electric cells having a particularly good mechanical strength and extensibility as well as a good capillary rise.

If the content of the said sulfonic acids in the molding materials is less than 0.05% by weight, relative to the molding material, an impairment of the mechanical properties of the sinter plates produced from the molding material is observed. If the content of free sulfonic acids in the molding materials rises above 0.5% by weight, the mechanical properties of the sintered plates are admittedly still good, but difficulties arise to an increasing extent in processing the molding materials, owing to inadequate heat stability. In addition, higher contents of free sulfonic acids render the molding material more expensive. It is preferable to employ molding materials containing 0.05 to 0.25% by weight, relative to the molding material, of at least one of the free sulfonic acids mentioned earlier in the text.

The amount of wetting agent in the molding material should be 0.005 to 0.5% by weight, relative to the molding material. Below 0.005% by weight the capillary rise required for good quality in the separator plates is not achieved. Above 0.5% by weight of wetting agent there is an increasing risk of foaming, if the separator plates are employed in electric cells in which gas is evolved during use or during charging, or which are subjected to frequent mechanical shocks during use. Good results are obtained if the molding materials contain 0.01 to 0.1% by weight of at least one of the wetting agents described.

The wetting agent used should be adequately soluble in water, i.e. soluble to the extent of more than 2% by weight at 20° C., and should contain 12 to about 50 carbon atoms and a quaternary nitrogen atom which forms a salt with a carboxylic or sulfonic acid group. A "quaternary nitrogen atom" is to be understood as meaning a nitrogen atom which carries a positive charge and takes part in 4 bonds, 1 to 4 bonds of which being with carbon atoms and the remainder (3 to 0) being bonds with hydrogen atoms.

It is preferable to employ, as the wetting agent, compounds of the following formulae:

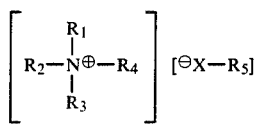

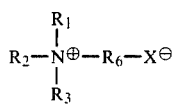

in which X denotes a —COO⁻ or an —SO₃⁻ group, R₁ denotes hydrogen or an alkyl or arylalkyl group, R₂, R₃ and R₄ each denotes an alkyl or arylalkyl group which can optionally be interrupted in the alkyl chain by ether oxygen bridges, particularly in such a manner that —C₂H₄O— or —C₃H₆O— groups are present in the chain; R₅ denotes an alkyl or alkylaryl radical and R₆ denotes an alkylene radical, all the radicals R₁ to R₆ and, if appropriate, also X together containing 12 to about 50 carbon atoms, and at least one of the radicals R₁ to R₄, and also the radical R₅, each containing at least 8 carbon atoms.

It is also possible to use mixtures of several of the wetting agents described in greater detail above.

The K-value of the graft copolymer present in the molding material is advantageously within the range from 55 to 90. Below a K value of 55 and above a K value of 90 the molding materials are more difficult to process and, in general, produce sintered plates of a poorer quality.

The bulk density of the molding materials is advantageously within the range from 400 to 700 g/liter. Lower bulk densities generally lead to a lower production output and to plates with coarser pores and less good mechanical properties; higher bulk densities generally lead to plates having an undesirably high electrical volume resistance. It is preferable to employ molding materials having a bulk density of 450 to 600 g/liter.

For the production of sintered plates which are used as separators for electric cells, the molding material should have an average particle size (average particle diameter) of 10 to 50 μm, measured by sedimentation analysis. Above an average particle size of 50 μm the resulting plates tend increasingly to have coarse pores; below an average particle size of 10 μm it is generally too difficult to produce plates which are still adequately permeable. It is preferable to employ molding materials having an average particle size of 20 to 35 μm. Sedimentation analysis is advisable for determining the average particle size, since it measures particle size ranges below 33 μm more accurately and is less sensitive to disturbances caused by polymer particles acquiring an electrostatic charge.

The invention also relates to a process for the preparation of a molding material described in greater detail above by suspension polymerization of vinyl chloride in an aqueous phase in the presence of oil-soluble activators which break down to give free radicals, suspension stabilizers, free emulsifiers and, if appropriate, further polymerization auxiliaries, up to vinyl chloride conversions of 70 to 95% by weight, removing the bulk of the aqueous phase and drying the polymer, further substances in a fine state of division being added to the polymer, if appropriate, after the removal of the aqueous phase or after drying, which comprises polymerizing vinyl chloride in the presence of at least one alkyl acrylate having 3 to 10 carbon atoms in the alkyl group and in the presence or absence of vinyl acetate, and also in the presence or absence of a copolymer which, in turn, is composed of: 30 to 70% by weight, relative to the copolymer, of polymerized units of ethylene and 70 to 30% by weight, relative to the copolymer, of polymerized units of vinyl acetate, and which also has an average molecular weight, determined by osmosis, of 5,000 to 200,000, and also in the presence of 0.01 to 0.7% by weight, relative to monomers employed, of at least one anionic emulsifier and/or at least one nonionic emulsifier having an HLB value of 10 to 40, the amounts of the monomers, and, if appropriate, the copolymer, to be employed being so chosen, bearing in mind the vinyl chloride conversion, that a (graft) copolymer is formed, the composition of which corresponds to the data of claim 1, determining the emulsifier content in the (graft) copolymer formed, after the completion of the polymerization and after the removal of the bulk of the aqueous phase, and adding sufficient of the emulsifiers mentioned in claim 1 to the polymer, in a finely divided form, for the polymer to contain a total of 0.05 to 0.5% by weight, relative to the dried polymer, of the said emulsifiers.

The polymerization is carried out in pressure-resistant equipment with agitation of the polymerization liquor, at temperatures of 45° to 70° C. Per 100 parts of vinyl chloride monomer employed, it is advantageous to employ about 150 to 300 parts of water, 0.01 to 0.2 part of an oil-soluble activator which is known for the suspension polymerization of vinyl chloride and which breaks down to give free radicals, or a mixture of several such activators, and 0.05 to 3 parts by weight of a known suspending agent which is customary for the suspension polymerization of vinyl chloride, for example a cellulose ether or a partially saponified polyvinyl acetate or mixtures of several such suspending agents. During the polymerization it is also possible to add known chain-terminating agents and/or antioxidants and also further polymerization auxiliaries.

The polymerization is continued until conversions of 70 to 95% by weight, relative to vinyl chloride monomer employed, are reached. Although molding materials which are still readily usable within the meaning of the invention are also obtained at lower degrees of conversion, lower degrees of conversion are less economical and generally offer no other advantages. Equally, it is disadvantageous to carry the polymerization further to conversions exceeding 95% by weight of vinyl chloride, since this requires considerably prolonged polymerization times which markedly reduce the space-time yield of polymers. Although it would be possible to compensate in part for this disadvantage by adding increased amounts of activators, this introduces unnecessary expense. It is preferable to carry out the reaction within the range from 85 to 95% by weight conversion of vinyl chloride.

The vinyl chloride is polymerized in the presence of an alkyl acrylate and, if appropriate, in the presence of vinyl acetate. If a particularly uniformly finely divided molding material is to be produced, polymerization is carried out in the additional presence of an ethylene/vinyl acetate copolymer containing 30 to 70% by weight of polymerized units of ethylene and 70 to 30% by weight of polymerized units of vinyl acetate (the percentages each relate to the copolymer).

If the copolymer has a content of ethylene units exceeding 70% by weight, difficulties arise in the polymerization of the vinyl chloride/alkyl acrylate mixture as the result of lump formation. If the copolymer contains more than 70% by weight of vinyl acetate units, it is no longer possible to prepare the molding material in an adequately uniform finely divided state. The copolymer is preferably composed of 60 to 40% by weight of polymerized units of ethylene and 40 to 60% by weight of polymerized units of vinyl acetate, and has an average molecular weight, measured by osmosis, of 15,000 to 50,000.

The vinyl chloride is polymerized in the presence of sufficient alkyl acrylate, in the presence or absence of sufficient vinyl acetate and in the presence or absence of sufficient ethylene/vinyl acetate copolymer for the polymer fraction of the molding material, bearing in mind the vinyl chloride conversion achieved in the polymerization, to contain the proportions of polymerized vinyl chloride, alkyl acrylate and, if appropriate, ethylene and vinyl acetate described in greater detail earlier in the text. It is possible to calculate the required amounts of starting materials, for example as described by H. G. Elias in "Makromoleküle" ("Macromolecules"), Verlag Hüthig und Wepf, Heidelberg, 1971, pages 632 et seq.

The table below shows two typical examples of polymers obtainable at various vinyl chloride conversions, using predetermined amounts of starting materials:

| Starting materials, relative to vinyl chloride (in % by weight) | Components present in the finished polymer, relative to polyvinyl chloride (in % by weight) Vinyl chloride conversions | | | |
|---|---|---|---|---|
| | 70% | 80% | 90% | 95% |
| 1% of ethylene/vinyl acetate copolymer | 1.43 | 1.25 | 1.10 | 1.05 |
| 15% of 2-ethylhexyl acrylate | 20.4 | 18.6 | 16.7 | 15.8 |
| 5% of vinyl acetate | 2.5 | 3.0 | 3.8 | 4.3 |
| 3% of ethylene/vinyl acetate copolymer | 4.3 | 3.8 | 3.3 | 3.2 |
| 20% of 2-ethylhexyl acrylate | 27.1 | 24.8 | 22.1 | 21.1 |
| 3% of vinyl acetate | 1.5 | 1.8 | 2.3 | 2.6 |

The vinyl chloride conversion achieved must also be taken into account when adding the emulsifier or emulsifiers to the polymerization mixture. Polymerization is carried out in the presence of 0.01 to 0.7% by weight, relative to monomers employed, of one or more of the emulsifiers described in greater detail earlier in the text, the content of free sulfonic acids in the (graft) copolymer formed is determined after the completion of the polymerization and after the removal of the bulk of the aqueous phase, and sufficient of the free sulfonic acids and wetting agents mentioned on pages 9 to 10 is added, in a finely divided form, to the polymer for the polymer to contain a total of 0.05 to 0.5% by weight, relative to the dry polymer, of the said free sulfonic acids and 0.005 to 0.5% by weight, relative to the dry polymer, of the said wetting agents.

For the preparation of the molding material, it is possible to polymerize the alkyl acrylate with the vinyl chloride by various processes. Thus, for example, vinyl chloride and an alkyl acrylate are initially jointly taken and polymerization is then started, or vinyl chloride is polymerized and an alkyl acrylate is introduced in portions or continuously into the polymerizing mixture when the vinyl chloride conversion has reached a specific value below 70%, or a combination of the two processes mentioned above is used, part of the total quantity of alkyl acrylate to be employed being initially taken together with the vinyl chloride and the polymerization then being started. When the vinyl chloride conversion has reached a specific value below 70% the remaining amount of alkyl acrylate is added in portions or continuously to the polymerizing mixture.

A procedure similar to that for the alkyl acrylate can also be employed for the vinyl acetate monomer which can optionally be introduced.

If polymerization is to be carried out in the presence of an ethylene/vinyl acetate copolymer, it is advanous to dissolve the latter in the monomer or monomer mixture initially taken. After the completion of the polymerization and after cooling and releasing the pressure of the polymerization vessel and expelling residual objectionable monomers, the polymer formed is separated from the aqueous polymerization liquor by customary methods, for example by filtration, decantation or centrifuging, and the emulsifier content of the polymer is determined, for example in a methanol extract, by titration with benzyldimethyl-2,2-p-1,1-3,3-tetramethylbutylphenoxyethoxyethylammonium chloride (see the journal "Fette, Seifen, Anstrichmittel", Volume 73 (1971), page 683; "Deutsche Einheitsmethoden zur Untersuchung von Fetten, Fettprodukten und verwandten Stoffen" ("German standard methods for the examination of fats, fat products and related substances"), 43rd Report, Prof. Seber, "Analyse von organischen, grenzflächenaktiven Stoffen II" ("The analysis of organic, surface-active substances II"); and also "Die Analytik der Tenside" ("The Analysis of Surfactants") by R. Wickbold, Hüls AG House Journal 1976, pages 30 et seq.).

On the basis of the analytical result, either the same emulsifier which was also used in the polymerization, or another emulsifier having an HLB value of 10 to 40, is then added to the polymer is an amount such that, after drying, the polymer contains 0.05 to 0.5% by weight, relative to the dry polymer, of emulsifier.

It is preferable to add to the polymer, after the polymerization and advantageously after separating off the bulk of the aqueous polymerization liquor, at least one water-soluble wetting agent containing 12 to about 50 carbon atoms and a quaternary nitrogen atom which forms a salt with a carboxylic or sulfonic acid group, this wetting agent being added in an amount such that the dry polymer contains 0.005 to 0.5% by weight of the said wetting agent(s). The said compounds can be added after the polymerization either to the water-moist polymer or to polymer which is already dry.

After the compounds have been added, the water and, if appropriate, further readily volatile substances present in the mixture are removed by customary drying methods. The sinterable, finely divided molding material is, in general, thereby ready for use. In particular cases, small amounts of specific substances, for example antioxidants, heat stabilizers, pigments or agents for improving the antistatic properties, can, if necessary, be mixed into the molding material.

In a preferred embodiment of the process according to the invention, polymerization is carried out in the presence of 0.01 to 0.2% by weight, relative to monomers employed, of the sulfonic acids mentioned above.

The invention also relates to a process for the production of a sintered molding, in particular a separator plate or separator compartment for an electric cell, which comprises sintering a molding material prepared by the process according to the invention, using elevated temperatures and in accordance with a process which is known per se.

The molding materials according to the invention make it possible to produce sintered, flexible, porous moldings which have a quality equal in regard to other physical and chemical properties with that of the sintered, porous moldings which hitherto could only be produced in a non-flexible form. The molding materials can be employed without problems on the processing machinery hitherto customary and do not require any complicated after-treatment in order to impart flexibility to the moldings. If desired, the molding materials can be prepared in such a manner that they produce sinter plates having a low average pore diameter as well as identical volume resistivity, capillary rise, ultimate tensile strength and elongation at break, as a result of which it becomes possible, with a saving of material, to produce thinner separator plates which, in addition, also display the advantage of a lower tendency for the "interpenetration" of conductive material. In addition, compared with known molding materials having approximately comparable properties, molding materials of this type, according to the invention, have a higher bulk density as well as good pourability, as a result of which processing is facilitated and the output from production machinery is increased.

The examples and comparison tests below are intended to illustrate the invention in greater detail. To facilitate comparison, the test results have been collated in a table. The various properties were determined by the following methods:

K-value: as specified in DIN 53,726

Bulk density: as specified in DIN 53,468

Amount of emulsifier: by titration with benzyldimethyl-2,2-p-1,1-3,3-tetramethylbutylphenoxyethoxyethylammonium chloride in accordance with "Deutsche Einheitsmethoden zur Untersuchung von Fetten, Fettprodukten und verwandten Stoffen" ("German standard methods for the examination of fats, fat products and related substances"), 43rd Report, Prof. Seber: "Analyse von organischen, grenzflächenaktiven Stoffen II" ("The analysis of organic, surface-active substances II") in the journal: "Fette, Seifen, Anstrichmittel", Volume 73 (1971), page 683.

Particle size distribution: by air jet sieve analysis as specified in DIN Draft No. 53,734.

Average particle diameter: by sedimentation analysis using the following method: 1.82 g of polyvinyl chloride are dispersed in 600 ml of a 0.09% strength solution of sodium pyrophosphate which has been thoroughly degassed, and the sedimentation tendency is measured using a Sartorius type 4600 sedimentation balance at a feed rate of the recording paper of 120 mm/hr. The calculation is carried out by the known Stoke's formula and gives the radius of the particles. The latter is evaluated with the granular metric grid by the method of Rosin-Ramler and Sperling.

Pourability: as specified by J. Gäbler "Kunststoffe Hoechst" Reprint No. 6172 "Prüfung von PVC-Pulvern" ("The testing of PVC powders"), page 2, item 4 (1977). The method used is that in which six funnels of varying outlet apertures are filled with powder and the number of the funnel from which the powder still just flows freely is taken. The higher the number of the funnel, the poorer the pourability.

Measurements Carried Out On The Sintered Plate

Preparation of the sinter plates: separator plates for electric cells are produced on a continuous band-sintering machine. In this process, polyvinyl chloride powder is applied in a specific layer thickness to a continuous steel band and is sintered by being passed through an oven, the electrical heating of which has been set at 325° C. By varying the band speed it is possible to control the dwell time in the sintering zone and thus the intensity of sintering of the PVC powder. The band speed is adjusted to values between 1.5 and 1.9 m/minute, preferably 1.7 m/minute, so that the finished separator plate has an electrical resistance of 1.6 m$\Omega$/dm$^2$. The separator plates have a sheet thickness of 0.2 mm and a rib thickness of 0.7 mm.

Elongation at break and ultimate tensile strength: the elongation at break (elongation at breaking force) and the ultimate tensile strength are determined by a method modelled on DIN Specification 53,455—Tensile Tests on Plastics. Since no standardized test specimens are available, samples of dimensions 60×140 mm are cut from the sintered plates. The test is carried out on a tensile testing machine meeting the general conditions for tensile testing machines (DIN 51,220, Class 1 and DIN 51,221), after storage for 16 hours in a standard climate (DIN 5,001) at 23°±2° C. and 50+5% relative humidity. The testing speed (the speed at which the two jaws move apart) is 50 mm per minute +10%. The measuring range for force is 10 N. The recording of force and elongation is effected via a recording mechanism on a chart roll. The forward feed proportional to elongation (graph chart: traverse) is adjusted to a magnification of 5 to 1. The elongation is relative to a free distance of 100 mm between jaws.

Specific electrical resistance: the electrical resistance of separators is determined by measuring the so-called internal resistance of cells, and is measured in a test set-up (battery cell) devised specially for the purpose. The difference in the cell resistance with and without the separator gives the negative resistance of the separating element. The volume resistivity is determined in $\Omega$.cm by multiplying the result by the ratio of sheet surface to sheet thickness.

The test cell itself comprises a positive and a negative plate (PbO$_2$ and Pb), which are mounted parallel to one another at a distance of 7 mm. Plates of the same size and design as are used in a lead accumulator are taken as the electrodes. The separator is located exactly between the electrodes in a window-shaped recess of dimensions 100×100 mm. The test cell is filled with sulfuric acid of density 1.28 g per cm$^3$, and is fully charged. The measurement of such low-value internal resistances is carried out using a direct reading micro-ohm meter (Type EMT 326, made by Elektromesstechnik E. Franz KG, Lahr), which is connected to the two electrodes. Mains alternating current is used.

Capillary rise: determination of the capillary rise is used as a measure of the wettability of the separator plates and to characterize their porosity. A strip 1 cm wide of the separator is placed in a test tube which is filled with water to a level of 1.5 cm. The level of the wettability in millimeters, after an immersion time of 10 minutes, is taken as the capillary rise.

Flexibility: test specimens of dimensions 90×140 mm are cut out from the sintered plates produced as described earlier in the text, in such a way that the ribs run parallel to the cut edge of length 140 mm. This test specimen is clamped between two flat metal plates, each having a thickness of 2 mm and dimensions of 120×100 mm, placed coincidentally on top of one another, in such a way that about half the test specimen projects beyond the plates and the ribs of the test specimen run perpendicular to the edges of the two metal plates beyond which the test specimen projects. The two metal plates are mounted horizontally and the ribs of the test specimen should point downwards. The edge of the upper metal plate beyond which the test specimen projects is rounded in the shape of a semi-circle. The projecting section of the test specimen is then bent upwards around this edge through 180° in the course of about 30 seconds, so that the projecting section of the test specimen which has been bent over rests on the surface of the upper metal plate. A further metal plate which engages from below with the projecting section of the test specimen and twists the latter through 180° is used for bending over the test specimen. After the conclusion of the twisting, the area of the test specimen which was bent over around the rounded edge of the upper metal plate is examined for cracks. If such cracks appear, the plate is unusable. The determination is carried out on groups of five test specimens successively at room temperature and about 60% relative humidity. Even if only one crack is observed, this is recorded in Table 2 below by the note "fracture". If all five test specimens survive the method of determination without cracking, a note "no fracture" is put in Table II. Such plates can be used for the application intended.

Comparison Test A

A mixture of vinyl chloride and the additives shown under VA in Table I (PW=parts by weight) is polymerized in a pressure-resistant stainless steel kettle, equipped with an impeller stirrer, at 53° C., with stirring, at the autogenous pressure of the vinyl chloride until the pressure has fallen to 0.4 mPa. The pressure is then released, the resulting fine-grained polymer suspension is freed from residual vinyl chloride monomer by known processes, and the polymer is separated from the bulk of the aqueous polymerization liquor by means of a decanter centrifuge. The product thus obtained still contains approx. 20% by weight, relative to the product, of water. The wetting agent shown in Table II is then added to the water-moist product while the latter is agitated. The quantity data in Table II are percentages by weight, relative to the dried product. After the addition, the product is dried with hot air.

The properties shown in Table II are determined on the molding material obtained in this way. Sinter plates are prepared from one part of the molding material and these are used to determine the properties which are also listed in Table II. The methods of determination and the production of plates are described in greater detail earlier in the text.

EXAMPLES 1 AND 2

The procedure followed is as in comparison test A. The amounts of comonomer shown in Table I under $B_1$ or $B_2$ are put into the pressure-resistant kettle before polymerization and polymerization is carried out correspondingly under the autogenous pressure of all the monomers present at the temperatures indicated in Table I. When the bulk of the aqueous polymerization liquor has been removed after the polymerization, a sample of the water-moist product is taken, and its emulsifier content is determined as described earlier in the text. It is listed in percent by weight, relative to dried product, in Table II below. The substances indicated in Table II by identity and amount are then added to the water-moist product while the latter is agitated. The quantity data in Table II are percentages by weight, relative to dried product. The material is then dried as in comparison example A.

The values determined on the molding material and the sinter plates produced therefrom are indicated in Table II.

Comparison Test B (Analogous To German Offenlegungsschrift 2,310,431)

The procedure followed is as in comparison test A. For the polymerization recipe and temperature see Table I under VB. The determination of emulsifier content and the addition of emulsifier are as described in Examples 1 and 2. For the identity and amount of substances added subsequently, and for the properties determined, see Table II.

Comparison Tests C And D (Analogous To German Offenlegungsschrift 3,018,922)

The procedure followed is as in comparison test A. For the polymerization recipe and temperature see Table I under VC or VD, respectively. The ethylene/vinyl acetate copolymer is dissolved in vinyl chloride monomer by stirring at room temperature before the start of the polymerization. The determination of emulsifier content and the addition of emulsifier are as described in Examples 1 and 2. For the identity and amount of substances added subsequently and for the properties determined, see Table II.

EXAMPLES 3 AND 9

The procedure followed is as described in Examples 1 and 2. The comonomer II (VA) indicated in Table I under $B_9$ is added to the polymerization batch before heating is started; the comonomer I (EHA) indicated in Table I under $B_3$ or $B_9$, respectively, is metered continuously into the pressure-resistant kettle during the polymerization. This is started while heating up to the polymerization temperature indicated in Table I, and the continuous addition is terminated when 30% of the vinyl chloride employed have reacted. Polymerization is carried out until the pressure has fallen to 0.4 mPa, the pressure is then released and the product is worked up as indicated in Examples 1 and 2. For substances added subsequently and for properties determined, see Table II.

EXAMPLES 4 TO 8 AND 10 TO 14

The procedure followed is as indicated in Examples 1 and 2. The comonomers I and, where appropriate, II indicated in Table I under $B_4$ to $B_8$ and $B_{10}$ to $B_{14}$, respectively, are added to the polymerization batch before the start of the polymerization. For substances added subsequently and properties determined, see Table II.

The abbreviations in Table I below have the following meanings:
PW=parts by weight
% by weight
VAc=percent by weight of polymerized vinyl acetate, relative to the ethylene/vinyl acetate copolymer (the remainder is polymerized ethylene units)
EHA=2-ethylhexyl acrylate
BA=n-butyl acrylate iBA = isobutyl acrylate
VA = vinyl acetate PNA = n-propylnaphthalenesulfonic acid
CBA = cetylbenzenesulfonic acid.

TABLE I

| Example/Comparison test | | VA | B1 | B2 | VB | VC | VD | B3 | B4 | B5 |
|---|---|---|---|---|---|---|---|---|---|---|
| Vinyl chloride, | PW | 100 | 80 | 80 | 100 | 100 | 100 | 95 | 90 | 85 |
| Comonomer I | PW | — | 15 | 17 | — | — | — | 5 | 10 | 15 |
| | Identity | — | BA | EHA | — | — | — | EHA | EHA | EHA |
| Comonomer II | PW | — | 5 | 3 | — | — | — | — | — | — |
| | Identity | — | VA | VA | — | — | — | — | — | — |
| Ethylene/vinyl acetate copolymer | PW | — | — | — | — | 1 | 1 | 3 | 1 | 5 |
| | % by weight VAc | — | — | — | — | 45 | 45 | 45 | 45 | 48 |
| Water | PW | 200 | 200 | 200 | 198 | 200 | 200 | 200 | 200 | 200 |
| Suspending agent | PW | 0.5 | 0.4 | 0.4 | 0.5 | 0.2 | 0.2 | 0.2 | 0.2 | 0.6 |
| | Identity | SC 440 | MHPC 50 | MHPC 50 | MC 440 | MHPC 50 | MHPC 50 | MHPC 50 | MHPC 50 | MHPC 50 |
| Emulsifier | PW | 0.25 | 0.1 | 0.1 | 0.15 | 0.02 | 0.02 | 0.02 | 0.02 | 0.06 |
| | Identity | DBSNa | NaLS | POESL | DBA | DBA | AA | AA | DEA | PNA |
| Activator | PW | 0.06 | 0.06 | 0.06 | 0.02 | 0.02 | 0.04 | 0.04 | 0.06 | 0.05 / 0.01 |
| | Identity | EHPC | EHPC | EHPC | IPP | IPP | IPP | IPP | EHPC | LPO/TBPND |
| Polymerization temperature, °C. | | 53 | 53 | 53 | 60 | 60 | 55 | 53 | 53 | 66 |
| Vinyl chloride conversion, % | | 94 | 90 | 91 | 93 | 92 | 92 | 91 | 94 | 93 |

| Example/Comparison test | | B6 | B7 | B8 | B9 | B10 | B11 | B12 | B13 | B14 |
|---|---|---|---|---|---|---|---|---|---|---|
| Vinyl chloride, | PW | 80 | 80 | 80 | 80 | 80 | 80 | 80 | 80 | 88 |
| Comonomer I | PW | 10 | 20 | 15 | 15 | 20 | 10 | 15 | 15 | 10 |
| | Identity | EHA | EHA | DA | EHA | BA | IBA | EHA | EHA | EHA |
| Comonomer II | PW | 10 | — | 5 | 5 | — | 10 | 5 | 5 | 2 |
| | Identity | BA | — | VA | VA | — | DA | IBA | BA | VA |
| Ethylene/vinyl acetate copolymer | PW | 3 | 1 | 1 | 2 | 1 | — | 2 | — | 1 |
| | % by weight VAc | 40 | 45 | 45 | 48 | 48 | — | 40 | — | 48 |
| Water | PW 200 | 200 | 200 | 200 | 200 | 200 | 200 | 200 | 200 | |
| Suspending agent | PW | 0.6 | 0.3 | 0.6 | 0.4 | 0.8 | 1 | 0.5 | 0.4 | 0.03 |
| | Identity | MC 50 | MHPC 50 | MC 440 | MC 50 | MC 50 | MC 440 | MHPC 100 | MHPC 50 | MC 50 |
| Emulsifier | PW | 0.06 | 0.03 | 0.06 | 0.06 | 0.08 | 0.1 | 0.03 | 0.08 | 0.04 |
| | Identity | DBA | AA | OA | DBA | AA | CBA | AA | DBA | DBA |
| Activator | PW 0.04 | 0.06 | 0.02 | 0.04 | 0.02 | 0.06 | 0.06/0.01 | 0.02 | 0.06 | |
| | Identity | IPP | EHPC | IPP | IPP | IPP | EHPC | EHPC/ACSP | IPP | EHPC |
| Polymerization temperature, °C. | | 53 | 53 | 60 | 53 | 60 | 53 | 48 | 60 | 53 |
| Vinyl chloride conversion, % | | 95 | 94 | 89 | 90 | 94 | 92 | 92 | 94 | 91 |

DA = n-decyl acrylate
EHPC = di-2-ethylhexyl peroxydicarbonate
IPP = diisopropyl peroxydicarbonate
LPO = di-lauroyl peroxide
TBPND = tert.-butyl perneodecanoate
ACSP = acetylcyclohexanesulfonyl peroxide
MC 440 = methylcellulose, a 2% strength by weight aqueous solution of which has a viscosity of 440 mPa.s at 20° C.
MC 50 = methylcellulose, a 2% strength by weight aqueous solution of which has a viscosity of 50 mPa.s at 20° C.
MHPC 50 = methylhydroxypropylcellulose, a 2% strength by weight aqueous solution of which has a viscosity of 50 mPa.s at 20° C.
MHPC 100 = methylhydroxypropylcellulose, a 2% strength by weight aqueous solution of which has a viscosity of 100 mPa.s at 20° C.

The abbreviations in Tables I and II below have the following meanings:
DBA = n-dodecylbenzenesulfonic acid
DBSNa = sodium n-dodecylbenzenesulfonate
AA = an n-alkanesulfonic acid of varying chain lengths from $C_{12}$ to $C_{16}$ with a predominant content of $C_{14}$
NaLS = sodium laurylsulfonate
POESL = polyoxyethylenesorbitan monolaurate
OA = n-octylsulfonic acid The abbreviations in Table II below have the following meanings:
DHEA = N-dodecyl-N,N-dihydroxyethylamine
CDMB = N-coconut-alkyl-N,N-dimethylbetaine, "coconut-alkyl" denoting a mixture of alkyl groups of the following chain length distribution (%): $C_8=7$; $C_{10}=6$; $C_{12}=51$; $C_{14}=19$; $C_{16}=8$; $C_{18}=9$.
SDMB = N-stearyl-N,N-dimethylbetaine
DDMB = N-n-dodecyl-N,N-dimethylbetaine
CEOB =

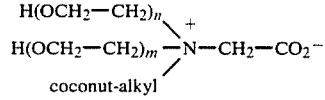

n + m = 10
CDMSB = N-coconut-alkyl-N,N-dimethylsulfobetaine
CEOSB =

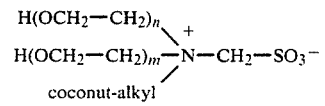

m + n = 10

The following information is given in Table II: the after-treatment of the polymers prepared in accordance with Table I, the properties of the molding materials thus produced and the properties of the sinter plates produced from these molding materials. The first vertical column of this Table gives the serial designation of the test, capital letters being chosen for comparison tests and numbers for the examples according to the invention. The second vertical column of Table II shows which polymer, prepared in accordance with Table I, was used. The third vertical column gives information taken from Table I on the parts by weight of ethylene/vinyl acetate copolymer which were employed per 100 parts by weight of vinyl chloride in the polymerization. The fourth vertical column shows the emulsifier content, determined by titration, of the decanter-moist polymer in percent by weight, relative to dry substance. The fifth vertical column shows how much emulsifier, in percent by weight relative to dry substance, was added subsequently to the decanter-moist polymer. The sixth vertical column contains information on the identity of the emulsifier added, and uses the same abbreviations as in Table I. The seventh vertical column shows what percentage by weight, relative to dry substance, of a wetting agent was added. In comparison test B, a tertiary amine which, with the excess sulfonic acid present, forms a salt effective as a wetting agent was added, in conformity with German Offenlegungsschrift No. 2,646,595. The eighth vertical column shows which wetting agent was added.

TABLE II

| Example No. | Polymer (Table I) | PW of EVAc/ 100 PW of VC | After-treatment of polymer | | | | | Properties of the molding material | |
|---|---|---|---|---|---|---|---|---|---|
| | | | Emulsifier content (by titration), % by weight | Emulsifier added, % by weight | Identity of emulsifier | Wetting agent added, % by weight | Identity of wetting agent | K valve | Bulk density, g/l |
| A | VA | — | 0.15 | — | — | 0.02 | CDMB | 70.2 | 420 |
| 1 | B$_1$ | — | 0.05 | 0.15 | NaLS | 0.02 | CDMB | 77.3 | 592 |
| 2 | B$_2$ | — | 0.06 | 0.20 | POESL | 0.03 | CDMB | 71.2 | 610 |
| B | VB | — | 0.08 | 0.08 | DBA | 0.05 | DHEA | 65.3 | 460 |
| C | VC | 1 | 0.01 | 0.14 | DBA | 0.03 | CDMB | 65.2 | 612 |
| D | VD | 1 | 0.01 | 0.14 | AA | 0.03 | CDMB | 69.5 | 634 |
| 3 | B$_3$ | 3 | 0.01 | 0.15 | AA | 0.05 | DDMB | 65.3 | 520 |
| 4 | B$_4$ | 1 | 0.01 | 0.14 | DBA | 0.03 | CDMB | 71.0 | 570 |
| 5 | B$_5$ | 5 | 0.04 | 0.11 | DBA | 0.03 | SDMB | 60.2 | 603 |
| 6 | B$_6$ | 3 | 0.03 | 0.09 | DBA | 0.03 | CEOB | 75.1 | 495 |
| 7 | B$_7$ | 1 | 0.02 | 0.13 | AA | 0.03 | 12 | 75.7 | 480 |
| 8 | B$_8$ | 1 | 0.03 | 0.15 | OA | 0.03 | CDMB | 65.6 | 596 |
| 9 | B$_9$ | 2 | 0.03 | 0.12 | PNA | 0.05 | CEOB | 71.1 | 510 |
| 10 | B$_{10}$ | 1 | 0.04 | 0.15 | AA | 0.05 | CDMSB | 72.3 | 530 |
| 11 | B$_{11}$ | — | 0.06 | 0.06 | CBA | 0.04 | CDMB | 78.1 | 564 |
| 12 | B$_{12}$ | 2 | 0.01 | 0.20 | AA | 0.03 | CEOSB | 82.4 | 570 |
| 13 | B$_{13}$ | — | 0.05 | 0.10 | DBA | 0.04 | CDMB | 68.2 | 610 |
| 14 | B$_{14}$ | 1 | 0.02 | 0.16 | DBA | 0.03 | CDMB | 71.8 | 565 |

| Example No. | Polymer (Table I) | Properties of the molding material Particle size distribution, % | | | | Average particle diameter, μm | Pourability; funnel No. | Properties of the sinter plate | | | | |
|---|---|---|---|---|---|---|---|---|---|---|---|---|
| | | >125 μm | >63 μm <125 μm | >33 μm <63 μm | <33 μm | | | Ultimate tensile strength, Nm | Elongation at break, % | Volume resistivity Ω·cm | Capillary rise, mm | Flexibility |
| A | VA | 0.1 | 2.1 | 19.8 | 78.0 | 31 | 4 | 12 | 2 | 4.1 | 112 | fracture |
| 1 | B$_1$ | 0 | 1.2 | 8.7 | 90.1 | 24 | 4 | 5.1 | 8.9 | 4.8 | 101 | no fracture |
| 2 | B$_2$ | 0.1 | 0.9 | 20.1 | 79.9 | 29 | 4 | 4.6 | 10.3 | 4.5 | 98 | no fracture |
| B | VB | 0 | 0.7 | 9.1 | 90.2 | 24 | 6 | 9.5 | 5.5 | 3.3 | 127 | fracture |
| C | VC | 0 | 0.9 | 15.1 | 84.0 | 28 | 4 | 6.1 | 5.0 | 2.9 | 125 | fracture |
| D | VD | 0.1 | 0.7 | 24.3 | 74.9 | 30 | 4 | 6.3 | 4.7 | 3.1 | 122 | fracture |
| 3 | B$_3$ | 0 | 2.9 | 23 | 74.1 | 34 | 4 | 6.7 | 8.4 | 4.6 | 118 | no fracture |
| 4 | B$_4$ | 0 | 0.7 | 6.2 | 93.1 | 28 | 4 | 7.7 | 9.6 | 4.8 | 119 | no fracture |
| 5 | B$_5$ | 0.1 | 1.8 | 17.9 | 80.2 | 30 | 4 | 6.8 | 12.8 | 4.2 | 102 | no fracture |
| 6 | B$_6$ | 0 | 1.1 | 4.8 | 94.1 | 23 | 4 | 3.9 | 19.2 | 4.3 | 83 | no fracture |
| 7 | B$_7$ | 0 | 0.8 | 6.1 | 93.1 | 22 | 4 | 4.1 | 18.5 | 4.3 | 79 | no fracture |
| 8 | B$_8$ | 0 | 0.3 | 4.8 | 94.9 | 21 | 4 | 5.9 | 15.1 | 4.1 | 98 | no fracture |
| 9 | B$_9$ | 0 | 0.2 | 3.7 | 96.1 | 21 | 4 | 5.0 | 13.7 | 4.2 | 103 | no fracture |
| 10 | B$_{10}$ | 0 | 1.8 | 4.7 | 93.5 | 30 | 4 | 3.5 | 16.8 | 4.6 | 98 | no fracture |
| 11 | B$_{11}$ | 0 | 0.2 | 2.8 | 97 | 20 | 4 | 5.3 | 12.7 | 5.1 | 84 | no fracture |
| 12 | B$_{12}$ | 0.1 | 0.5 | 8.7 | 91.7 | 26 | 4 | 4.7 | 14.9 | 4.3 | 101 | no fracture |
| 13 | B$_{13}$ | 0 | 2.9 | 22.3 | 74.8 | 30 | 4 | 5.9 | 18.2 | 4.1 | 97 | no fracture |
| 14 | B$_{14}$ | 0.1 | 2.3 | 19.2 | 78.4 | 28 | 4 | 6.4 | 8.3 | 3.9 | 115 | no |

TABLE II-continued fracture

We claim:
1. A finely divided molding material, based on polyvinyl chloride which can be sintered to give flexible, porous moldings, has a K-value of 55 to 90, a bulk density of 400 to 70 g/liter, an average particle size of 10 to 50 μm and a particle size distribution of:

| 99 to 30% by weight | <33 μm |
| 1 to 60% by weight | from 33 to 63 μm |
| 0 to 9% by weight | from 63 to 125 μm and |
| 0 to 1% by weight | >125 μm | and which consists essentially of:
(α) 99.8 to 97% by weight, relative to the molding material, of a vinyl chloride-alkyl acrylate copolymer which is a graft copolymer with poly(ethylene-vinylacetate) has been prepared by suspension polymerization of vinyl chloride monomer in the presence of at least one alkyl acrylate monomer, in the presence or absence of vinyl acetate monomer and in the presence of ethylene-vinylacetate copolymer, the latter having been dissolved in at least one said monomer or the monomer mixture, and the polymerization having been carried out in an aqueous phase, said vinyl chloride-alkyl acrylate copolymer has the following composition, in each case relative to the vinyl chloride-alkyl acrylate copolymer graft copolymerized with the ethylene-vinylacetate copolymer:
(a) 95 to 70% by weight of polymerized units of vinyl chloride,
(b) about 5 to 30% by weight of polymerized units of at least one alkyl acrylate having 3 to 10 carbon atoms in the alkyl group,
(c) 0.3 to 7% by weight of polymerized units of ethylene and
(d) 0.3 to 15% by weight of polymerized units of vinyl acetate, subject to the proviso that the amount of (d) is at least 3/7 of the amount of (c) and the total of the amounts of (b) plus (c) plus (d) is 5 to 30% by weight; and also
(β) 0.05 to 0.5% by weight, relative to the molding material, of at least one of the following free sulfonic acids: alkylsulfonic acids having 8 to 16 carbon atoms and alkylarylsulfonic acids having 3 to 16 carbon atoms in the alkyl chain;
(γ) 0.005 to 0.5% by weight, relative to the molding material of at least one water-soluble wetting agent containing 12 to about 50 carbon atoms and a quaternary nitrogen atom which forms a salt with a carboxylic or sulfonic acid group, and
(δ) a remainder, consisting essentially of suspending agents, residues of activators and other polymerization auxiliaries, subject to the proviso that the total of the amounts of α plus β plus γ plus δ is 100% by weight.
2. A molding material as claimed in claim 1 wherein the vinyl chloride-alkylacrylate copolymer copolymerized with poly(ethylene-vinylacetate) has the following composition:
(a) 95 to 70% by weight of polymerized units of vinyl chloride,
(b) 4.4 to 29.4% by weight of polymerized units of at least one alkyl acrylate having 3 to 10 carbon atoms in the alkyl group,
(c) 0.3 to 2.5% by weight of polymerized units of ethylene and
(d) 0.3 to 11% by weight of polymerized units of vinyl acetate, subject to the proviso that the amount of (d) is at least 3/7 of the amount of (c) and that the total of the amounts of (b) plus (c) plus (d) is 5 to 30% by weight.
3. A molding material as claimed in claim 1 which contains 0.05 to 0.25% by weight, relative to the molding material, of at least one of the free sulfonic acids mentioned in claim 1.
4. A molding material as claimed in claim 1 which contains 0.01 to 0.1% by weight, relative to the molding material, of at least one wetting agent mentioned in claim 1.
5. A molding material as claimed in claim 1 which has an average particle size of 15 to 35 μm.
6. A molding material as claimed in claim 1 wherein said remainder includes a minor amount of at least one further additive, subject to the said proviso that the sum of α to δ is 100% by weight.
7. A process for the preparation of a molding material as claimed in claim 1 by suspension polymerization of vinyl chloride in an aqueous phase in the presence of oil-soluble activators which break down to give free radicals, suspension stabilizers and emulsifiers, up to vinyl chloride conversions of 70 to 95% by weight, removing the bulk of the aqueous phase and drying the polymer, further substances in a fine state of division being added to the polymer, after the removal of the aqueous phase or after drying, which comprises polymerizing vinyl chloride in the presence of at least one alkyl acrylate having 3 to 10 carbon atoms in the alkyl group and in the presence or absence of vinyl acetate, and also in the presence of a graftable copolymer which, in turn, is comprised of: 30 to 70% by weight, relative to the copolymer, of polymerized units of ethylene and 70 to 30% by weight, relative to the copolymer, of polymerized units of vinyl acetate, and which also has an average molecular weight, determined by osmosis, of 5,000 to 200,000, and also in the presence of 0.01 to 0.2% by weight, relative to monomers employed, of at least one free sulfonic acid which is used as an emulsifier, the amounts of the monomers and the copolymer be employed being so chosen, bearing in mind the vinyl chloride conversion, that a graft copolymer is formed, the composition of which comprises:
(a) 95 to 70% by weight of polymerized units of vinyl chloride
(b) about 5 to 30% by weight of polymerized units of at least one alkyl acrylate having 3 to 10 carbon atoms in the alkyl group,
(c) 0.3 to 7% by weight of polymerized units of ethylene, as part of the graftable copolymer, and
(d) 0.3 to 15% by weight of polymerized units of vinyl acetate, subject to the proviso that the amount of (d) is at least 3/7 of the amount of (c) and that the total of the amounts of (b) plus (c) plus (d) is 5 to 30% by weight, the content of free sulfonic acids in the said resulting copolymer is determined after the completion of the polymerization and after the removal of the bulk of the aqueous phase, and sufficient of a said sulfonic acid and at least one water-soluble wetting agent containing 12 to about 50 carbon atoms and a quaternary nitrogen atom which forms a salt with a carboxylic or sulfonic acid group is added to the polymer, in a finely divided form, for the polymer to contain a total of 0.05 to 0.5% by weight, relative to the dry polymer, of a said free sulfonic acid and 0.005 to 0.5% by weight, relative to the dry polymer, of a said wetting agent, said free sulfonic acid being an alkylsulfonic acid having 8 to 16 carbon atoms or an alkylarylsulfonic acid having 3 to 16 carbon atoms in the alkyl chain.

8. The process as claimed in claim 7 wherein vinyl chloride is polymerized in the presence of at least one alkyl acrylate having 3 to 10 carbon atoms in the alkyl group and in the presence or absence of vinyl acetate, and also in the presence of a graftable copolymer, which, in turn, is comprised of: 40 to 60% by weight, relative to the copolymer, of polymerized units of ethylene and 60 to 40% by weight, relative to the copolymer, of polymerized units of vinyl acetate, and which also has an average molecular weight, determined by osmosis, of 15,000 to 50,000.

9. The process as claimed in claim 7, wherein the amounts of the monomers and copolymers to be employed are so chosen, bearing in mind the vinyl chloride conversion, that the graft copolymer comprises:
(a) 95 to 70% by weight of polymerized units of vinyl chloride,
(b) 4.4 to 29.4% by weight of polymerized units of at least one alkyl acarylate having 3 to 10 carbon atoms in the alkyl group,
(c) 0.3 to 2.5% by weight of polymerized units of ethylene, as part of the graftable copolymer, and
(d) 0.3 to 11% by weight of polymerized units of vinyl acetate, subject to the proviso that the amount of (d) is at least 3/7 of the amount of (c) and that the total of the amounts of (b) plus (c) plus (d) is 5 to 30% by weight.

10. A process for the production of a separator plate or separator compartment for an electric cell, which comprises molding and sintering a molding material as claimed in claim 1 at elevated temperatures.

* * * * *